F. H. MOORE.
EYE-GLASS SUPPORTERS.

No. 195,629.    Patented Sept. 25, 1877.

Frederic H. Moore

UNITED STATES PATENT OFFICE.

FREDERIC H. MOORE, OF BOSTON, MASSACHUSETTS.

IMPROVEMENT IN EYEGLASS-SUPPORTERS.

Specification forming part of Letters Patent No. 195,629, dated September 25, 1877; application filed June 9, 1877.

*To all whom it may concern:*

Be it known that I, FREDERIC H. MOORE, of Boston, in the county of Suffolk and State of Massachusetts, have invented a new and useful Improvement in Eyeglass-Supporters, which improvement is fully set forth in the following specification and accompanying drawing.

The object of my invention is to provide an attachment to the ordinary spring-eyeglasses by which they can, at will, be transformed into spectacles, and as quickly relieved from the attachment.

It is well known that eyeglasses are more convenient for ordinary use than spectacles, they being more compact when closed, and more quickly available when suddenly needed; and it is also well known that when much continuous reading or writing is done the pressure of the spring needful to keep the glasses in place, frequently causes inflammation of the parts of the nose clasped by it, and a consequent irritation of nerves connected with the eye, causing much distress and discomfort.

To obviate these disadvantages I have provided a supporter for the eyeglasses when long-continued use is required, so arranged that it can be carried in the pocket or kept on the desk, and instantaneously applied to the eyeglasses when its services are required. This apparatus is simple, cheap, and effective, and is intended to meet a want long felt by persons who require such a continuous use of the eyeglasses.

Figure 1:
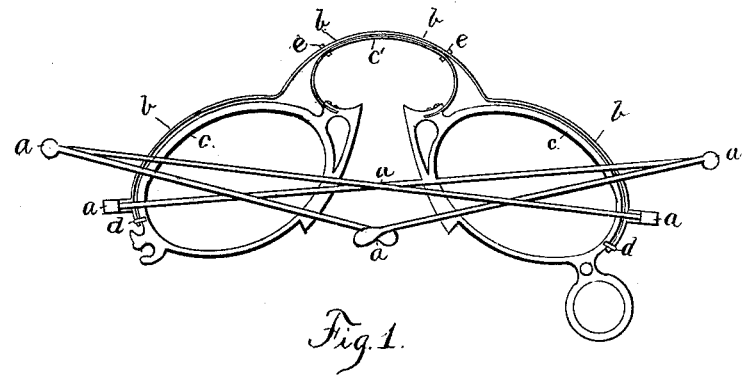
Figure 2:
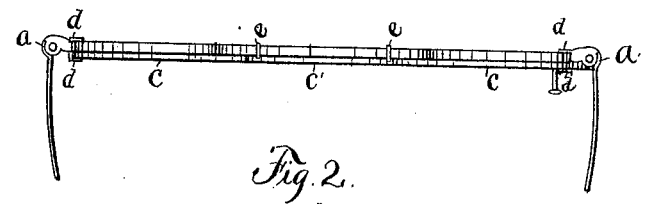

In the drawings I have shown, in Figures 1 and 2, a pair of eyeglasses as supported in my apparatus, consisting of a pair of ordinary spectacle-bows, $a\ a$, to which is attached the spring $b$, bent to conform to the curves $c\ c$ of the frame, and to the spring $c'$ of the eyeglasses. Near the ends of the spring $b$ are loops $d\ d$ of U shape, formed to receive and hold the frame $c\ c$ between their horns, which horns project on each side of the frame toward the glass. Other loops $e\ e$ are provided, as shown, to hold the spring $c'$ of the eyeglasses to the spring $b$ of the supporter. These loops $d\ d\ e\ e$ may be made elastic or rigid, as required.

By placing one of the sides of the eyeglass-frame $c$ in the loop $d$, then inserting the spring $c'$ in the loops $e\ e$, and then bending out the frame $b$, so that the other loop $d$ will clasp the other part of the frame $c$, the eyeglasses are transformed into spectacles, and the reverse of this motion transforms them again into eyeglasses.

Figure 3:
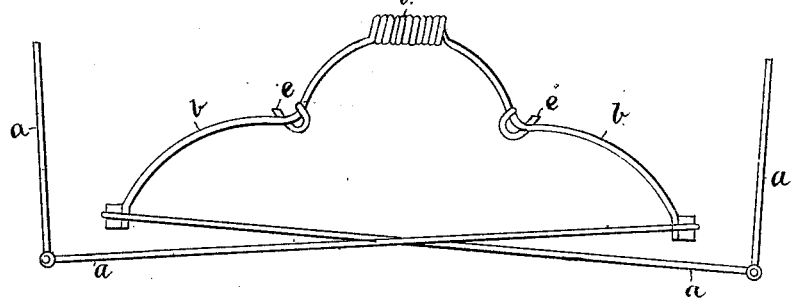

The form of supporter above described is the one I have adopted as the best after numerous experiments; but I do not wish to confine myself to that particular form, as the eyeglass may be attached to the supporter in other ways. For instance, the loops $d\ d$ may be dispensed with, and the loops $e\ e$ may be made as hooks, and placed in such position that they will clasp the loops of the spring $c'$, as shown in Fig. 3, and hold the glasses firmly in place. Again, the spectacle-bows may be dispensed with, and the supporter held in place by some fibrous or other contrivance passing around or over the head, or partially so.

Figure 4:
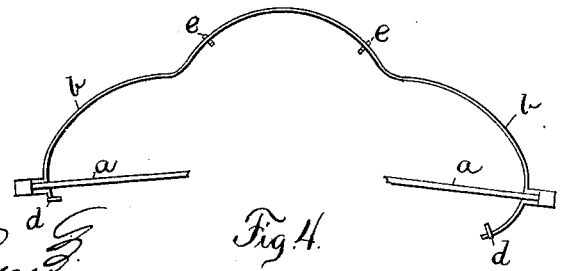

Fig. 4 represents my supporter when detached from the eyeglasses.

Having thus described my invention, what I claim as new, and desire to secure by Letters Patent, is—

The device above described, consisting of the piece $b$, provided with clasps $d\ e$ and bows $a\ a$, and adapted to receive and hold an eyeglass, as set forth.

FREDERIC H. MOORE.

Witnesses:
 A. H. SPENCER,
 CHAS. F. SLEEPER.